United States Patent
Takahashi et al.

(10) Patent No.: US 7,483,777 B2
(45) Date of Patent: Jan. 27, 2009

(54) CONTROLLER FOR COLLISION OBJECT PROTECTION DEVICE

(75) Inventors: Hiroyuki Takahashi, Aichi (JP); Yoshihiro Fujikawa, Toyota (JP); Shuji Masuda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 458 days.

(21) Appl. No.: 10/546,633

(22) PCT Filed: Jun. 29, 2004

(86) PCT No.: PCT/JP2004/009142

§ 371 (c)(1),
(2), (4) Date: Aug. 24, 2005

(87) PCT Pub. No.: WO2005/005210

PCT Pub. Date: Jan. 20, 2005

(65) Prior Publication Data

US 2006/0212201 A1     Sep. 21, 2006

(30) Foreign Application Priority Data

Jul. 9, 2003    (JP) ............................. 2003-194099

(51) Int. Cl.
*B60R 21/34*     (2006.01)
(52) U.S. Cl. ........................ 701/45; 280/762
(58) Field of Classification Search ............... None
See application file for complete search history.

(56) References Cited

U.S. PATENT DOCUMENTS

| | | | |
|---|---|---|---|
| 6,408,237 B1 | 6/2002 | Cho | |
| 6,415,882 B1 | 7/2002 | Schuster et al. | |
| 6,474,679 B2 | 11/2002 | Miyasaka | |
| 6,516,278 B1* | 2/2003 | Ishizaki et al. | 702/33 |
| 6,561,301 B1 | 5/2003 | Hattori et al. | |
| 6,802,556 B2* | 10/2004 | Mattsson et al. | 296/187.09 |
| 7,143,856 B2* | 12/2006 | Takahashi et al. | 180/274 |
| 7,201,394 B2* | 4/2007 | Mori et al. | 280/728.3 |
| 7,303,040 B2* | 12/2007 | Green et al. | 180/274 |
| 2002/0033755 A1 | 3/2002 | Ishizaki et al. | |

FOREIGN PATENT DOCUMENTS

| | | |
|---|---|---|
| DE | 100 14 832 A1 | 10/2001 |
| DE | 100 56 598 A1 | 5/2002 |
| EP | 0 967 128 A2 | 12/1999 |
| EP | 1 176 062 A2 | 1/2002 |
| JP | 07-156749 * | 6/1995 |
| JP | 08-258667 * | 10/1996 |
| JP | 08-324380 * | 12/1996 |
| JP | 11-310095 | 11/1999 |
| JP | 2000-211553 | 8/2000 |

(Continued)

*Primary Examiner*—Michael J. Zanelli
(74) *Attorney, Agent, or Firm*—Finnegan, Henderson, Farabow, Garrett & Dunner, LLP.

(57) ABSTRACT

A controller for controlling a plurality of collided object-protecting apparatuses for absorbing impact at the time when a collided object collides with a hood, the controller including at least a predicting mechanism for predicting a vehicle collision and detecting mechanism for detecting a vehicle collision, and a control mechanism for controlling operations of the plurality of the collided object-protecting apparatuses, respectively, at different timings.

7 Claims, 12 Drawing Sheets

FOREIGN PATENT DOCUMENTS

| | | |
|---|---|---|
| JP | 2001-018844 | 1/2001 |
| JP | 2001-315599 | 11/2001 |
| JP | 2001-322518 | 11/2001 |
| JP | 2002-079906 | 3/2002 |
| JP | 3328608 | 7/2002 |
| JP | 2003-081052 | 3/2003 |
| JP | 2003-182510 | 7/2003 |
| JP | 2003-182511 | 7/2003 |
| JP | 2003-191818 | 7/2003 |
| JP | 2003-291758 | 10/2003 |
| JP | 2003-306123 | 10/2003 |
| JP | 2004-017812 | 1/2004 |
| JP | 2004-161191 | 6/2004 |

* cited by examiner

US 7,483,777 B2

CONTROLLER FOR COLLISION OBJECT PROTECTION DEVICE

FIELD OF THE INVENTION

The present invention relates to a controller for an apparatus for protecting objects collided with a vehicle (hereinafter, a "collided object-protecting apparatus"). More particularly, the present invention relates to a controller of a collided object-protecting apparatus such as a lift-up hood mechanism, a hood airbag apparatus or the like, the lift-up hood mechanism protecting a pedestrian or the like as a collided object by lifting up a hood and the hood airbag apparatus protecting a pedestrian or the like as a collided object by inflating airbags in the vicinity of the rear of the hood.

BACKGROUND ART

Document 1 discloses an example of a collided object-protecting apparatus for effectively absorbing shock (impact) energy applied to a collided object during a vehicle collision.

Document 1 discloses a technology in which, when a collision between a vehicle and a pedestrian is detected by a pedestrian-detecting mechanism, due to the pedestrian detecting mechanism, a release mechanism is operated to release an engagement between a hood lock mechanism and a striker, and a spring force is used to lift up the front of a hood in a predetermined lifting amount, thus enabling the front of the hood to be moved to a position at which impact energy during a vehicle collision can be absorbed effectively.

Further, as a technology similar to that of Document 1, a technology in which impact energy with respect to a collided object is absorbed by lifting up the rear of a hood or that in which the impact energy is absorbed by inflating airbag apparatuses in the vicinity of the rear of a hood.

Now, it can be considered to provide a vehicle with a plurality of such collided object-protecting apparatuses as described above. However, in predicting a vehicle collision, if the rear of a hood is lifted up or airbags equipped in the vicinity of the rear of the hood are inflated, in reality, at the stage of a prediction, the rear of the hood is lifted up or airbags in the vicinity of the rear of the hood are inflated. For this reason, a problem is caused in that a driver's visibility is hindered by the lifted up hood or the inflated airbag apparatuses, thus deteriorating visibility.

Further, once airbag apparatuses are inflated, in order to restore the airbag to the original condition, there is no way other than replacing the airbag apparatuses with new ones. Accordingly, it is necessary to avoid unexpected inflation of airbag apparatuses.

(Document 1: Japanese Patent Application (JP-A) Laid-Open No. 2002-79906).

DISCLOSURE OF THE INVENTION

Problems to be Solved by the Invention

The present invention has been accomplished in order to solve the aforementioned problems, and an object of the present invention is to provide a controller for a collided object-protecting apparatus in which the controller can operate a plurality of collided object-protecting apparatuses, each having a front portion lift-up mechanism for lifting up the front of a hood, respectively, at different timings.

Means for Solving the Problems

In order to achieve the aforementioned object, the present invention provides a controller for a plurality of collided object-protecting apparatuses for absorbing impact at a time when a collided object collides with a hood, the controller comprising: a control mechanism for controlling operations of the plurality of the collided object-protecting apparatuses, respectively, at different timings.

Further, the present invention provides a controller for a plurality of collided object-protecting apparatuses, the plurality of collided object-protecting apparatuses comprises a first shock-absorbing mechanism and a second shock-absorbing mechanism, and the control mechanism further comprises a predicting mechanism for predicting a vehicle collision and a detecting mechanism for detecting a vehicle collision, wherein the control mechanism controls an operation of the first shock-absorbing mechanism based on prediction results of the prediction mechanism, and controls an operation of the second shock-absorbing mechanism based on detection results of the detection mechanism.

The present invention provides a method of controlling a collided object-protecting apparatus comprising at least a first shock-absorbing mechanism and a second shock-absorbing mechanism for absorbing impact at the time when a collided object collides with a hood, comprising: controlling an operation of the first shock-absorbing mechanism based on prediction results of a prediction mechanism for predicting a vehicle collision; controlling an operation of the second shock-absorbing mechanism based on detection results of a detection mechanism for detecting a vehicle collision; and controlling operations of the first shock-absorbing mechanism and the second shock-absorbing mechanism, respectively, at different timings.

According to the aforementioned present invention, the plurality of the collided object-protecting apparatuses comprises apparatuses for absorbing impact when a collided object collides with a hood of a vehicle. When the collided object is a pedestrian or the like, impact with respect to the collided object such as a pedestrian or the like can be absorbed effectively. Each of the plurality of the collided object-protecting apparatuses includes at least a front portion lift-up mechanism for absorbing impact by lifting up the front of the hood. In other words, impact with respect to the collided object can be absorbed effectively by the front of the hood, by the front portion lift-up mechanism lifting up the front of the hood. In addition, other than this, for example, a rear portion lift-up mechanism for absorbing impact by lifting up the rear of a hood or a hood airbag apparatus for absorbing impact by inflating hood airbag apparatuses equipped at the rear of the hood can be applied to the plurality of the collided object-protecting apparatuses. In other words, impact with respect to the collided object can be absorbed effectively by the rear of the hood, due to the rear portion lift-up mechanism lifting up the rear of the hood, and impact with respect to the collided object can be absorbed effectively by the airbag apparatuses, due to the hood airbag apparatus inflating the airbag apparatuses over the hood.

Here, operations of the plurality of the collided object-protecting apparatuses described above are controlled, respectively, at different timings, by the control mechanism, and the collided object-protecting apparatuses can be operated at a timing at which each collided object-protecting apparatus can operate effectively without being adversely affected, thus making it possible to operate the collided object-protecting apparatus at a suitable optimal timing.

For example, if the plurality of the collided object-protecting apparatuses comprises the front portion lift-up mechanism for lifting up the front of the hood and the rear portion lift-up mechanism for lifting up the rear of the hood, the plurality of the collided object-protecting apparatuses may further be provided with a predicting mechanism for predicting a vehicle collision and a detecting mechanism for detecting a vehicle collision, and the control mechanism controls an operation of the front portion lift-up mechanism based on prediction results of the prediction mechanism and an operation of the rear portion lift-up mechanism based on detection results of the detection mechanism. Therefore, when a vehicle collision is predicted, the control mechanism can control to operate the front portion lift up mechanism, and when a vehicle collision is detected, the control mechanism can control to operate the rear portion lift-up mechanism. Accordingly, frequencies at which a driver's visibility is obstructed by the hood lifted up by the rear portion lift-up mechanism can be minimized, thus making it possible to control each collided object-protecting apparatus at an optimal operational timing.

Further, if the plurality of the collided object-protecting apparatuses comprises the front portion lift-up mechanism for lifting up the front of the hood and the hood airbag apparatus equipped at the rear of the hood, the plurality of the collided object-protecting apparatuses may further be provided with a predicting mechanism for predicting a vehicle collision and a detecting mechanism for detecting a vehicle collision, and the control mechanism controls an operation of the front portion lift-up mechanism based on prediction results of the prediction mechanism and an operation of the hood airbag apparatus based on detection results of the detection mechanism. Therefore, when a vehicle collision is predicted, the control mechanism can control to operate the front portion lift up mechanism, and when a vehicle collision is detected, the control mechanism can control to inflate the hood airbag apparatus. Accordingly, unnecessary inflation of the hood airbag apparatus can be prevented, thus making it possible to control each collided object-protecting apparatus at an optimal operational timing.

BEST MODE FOR CARRYING OUT THE INVENTION

Hereinafter, with reference to the drawings, a detailed description of an example of an embodiment of the present invention will be made.

First Embodiment

First, a collided object-protecting apparatus according to a first embodiment of the present invention will be explained. The collided object-protecting apparatus according to the first embodiment includes a front-portion lift-up mechanism as a first shock-absorbing mechanism for lifting up the front of a hood and a rear-portion lift-up mechanism as a second shock-absorbing mechanism for lifting up the rear of the hood.

Figure 1:
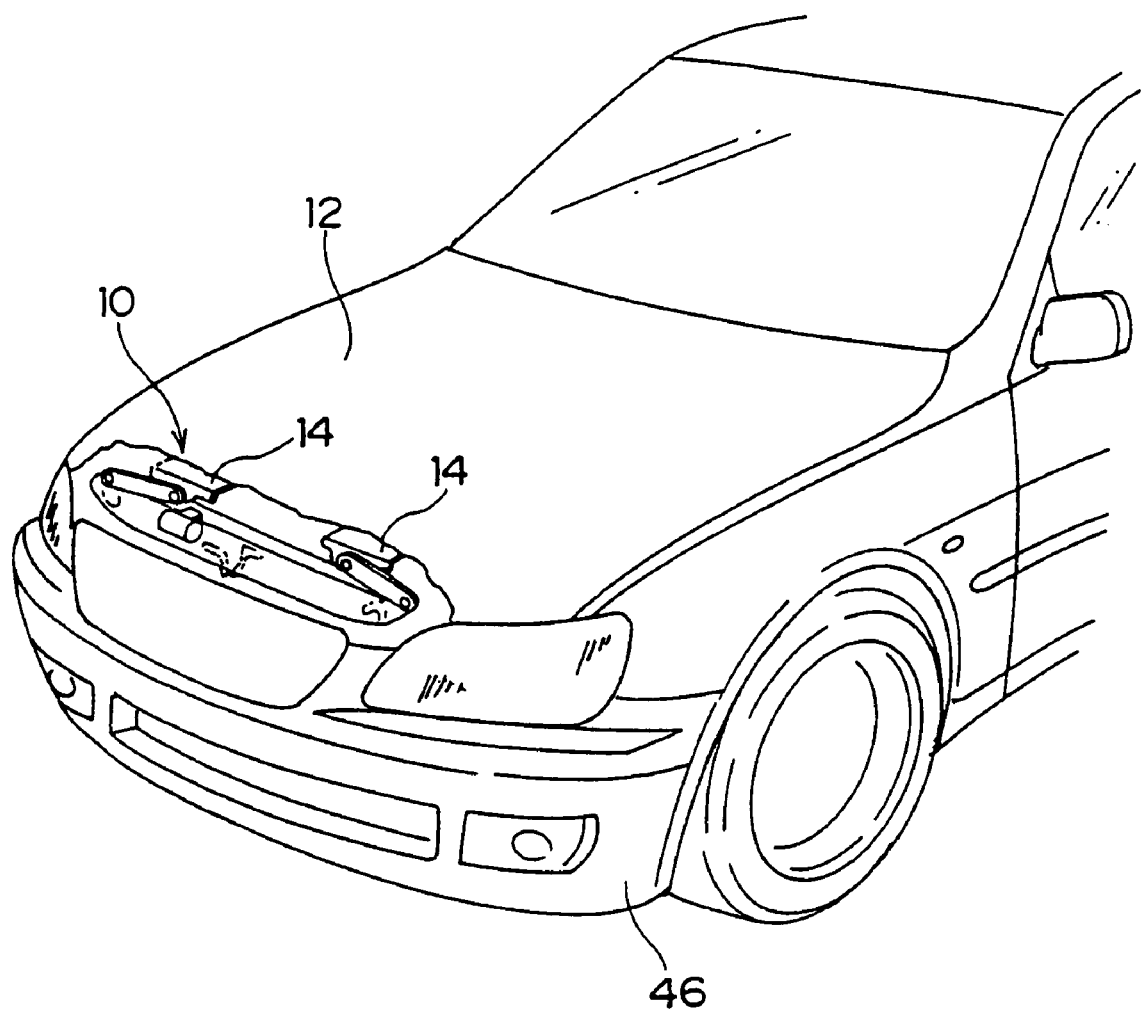
FIG. 1 is a perspective view of an example of a front portion lift-up mechanism in a state of being mounted to a vehicle.

Here, with reference to FIG. 1, a front portion lift-up mechanism will be explained. A front portion lift-up mechanism 10 is provided at the front of a hood 12, and the front of the hood 12 is lifted up by a link mechanism that will be described below.

A pair of hood inner panels 14 is adhered to the back surface of the hood 12 in order to obtain a design configuration or a tensional rigidity of the hood 12.

Figure 2:
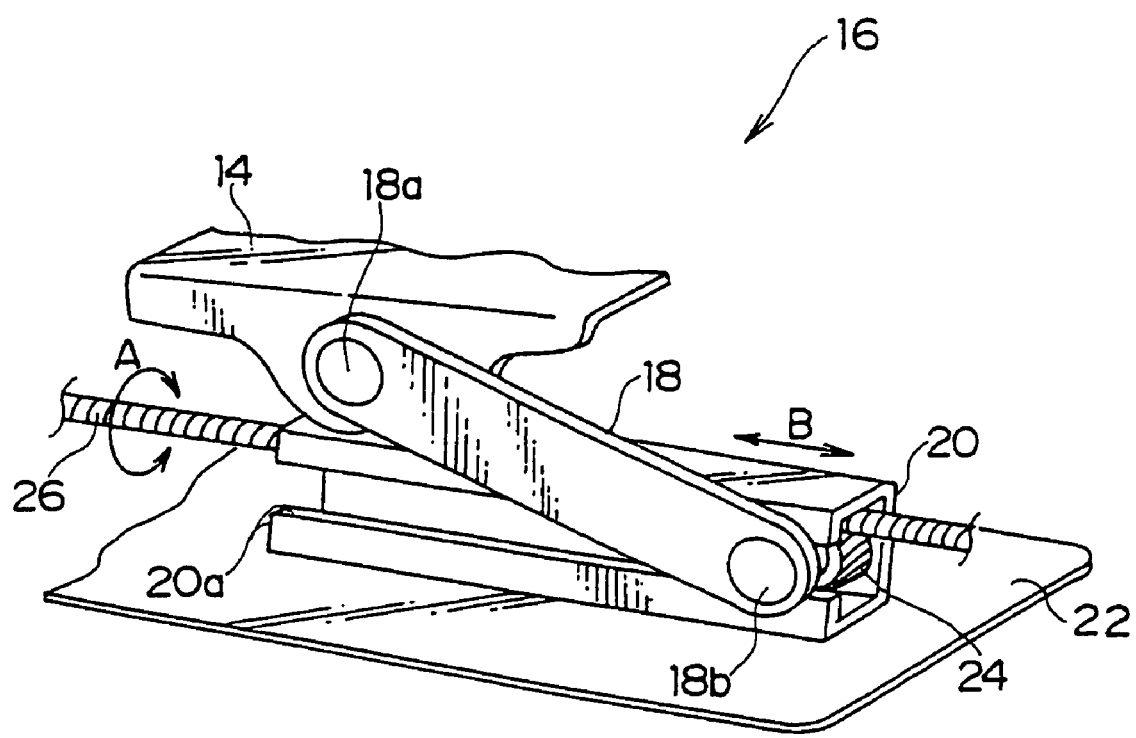
FIG. 2 is an enlarged perspective view of a link mechanism in the front portion lift-up mechanism in FIG. 1.

Here, with reference to FIGS. 2 and 3, a detailed description of the aforementioned link mechanism will be made.

A link mechanism 16, which mainly includes a link member 18 and a slide rail 20, is provided in a pair in a transverse direction of a vehicle (hereinafter, vehicle transverse direction). Note that, in the present embodiment, although an example of providing a pair of the link mechanisms 16 is explained, the present invention is not limited to this, and instead, a single link mechanism or a plurality of link mechanisms can be adopted.

At least two portions at the front side of the hood inner panel 14 are folded into a flange shape, and through holes are formed thereat. One end portion 18a of the link member 18 is pivotally supported by the through hole so as to be freely rotatable. The other end portion 18b of the link member 18 is pivotally supported by the slide rail 20 which is mounted on a lock striker reinforce 22 so as to be movable in a vehicle transverse direction. The slide rail 20 is formed into a substantially box shape, and a slide groove 20a is formed at the slide rail 20 along the vehicle transverse direction. The other end portion 18b of the link member 18 is pivotally supported by the slide groove 20a so as to be freely rotatable and slidably movable in the vehicle transverse direction.

Specifically, a gear 24 is provided at the other end portion 18b of the link member 18 so as to be freely rotatable, a rotational axis of the gear 24 is pivotally supported to the other end portion 18b of the link member 18. Further, a rotational axis of the gear 24 is movable along the slide groove 20a. In other words, the other end portion 18b of the link member 18 is movable along the slide groove 20a of the slide rail 20 in a state in which the slide groove 20a is interposed between the gear 24 and the link member 18 (i.e., a state in which an edge portion of the slide groove 20a is disposed between the gear 24 and the link member 18).

Further, a spirally threaded-geared cable 26 is provided inside the slide rail 20. The geared cable 26 meshes with the gear 24 which is pivotally supported to the other end portion 18b of the link member 18. Due to a rotation of the geared cable 26 in a direction of arrow A in FIG. 2, the gear 24 is rotated, and the other end portion 18b of the link member 18 is moved in a direction of arrow B of FIG. 2, along the slide groove 20a of the slide rail 20, and the geared cable 26.

Moreover, a pair of the link mechanisms 16 is structured such that the spirally threaded grooves, which are formed on the geared cable 26, are threaded in directions inverted to each other at one link mechanisms 16 side and at the other link mechanism 16 side. Accordingly, due to a rotation of the geared cable 26, the other end portions 18b of the link members 18 of the pair of the link mechanisms 16 are moved together in the same direction such as a vehicle internal direction or a vehicle external direction.

Figure 3:
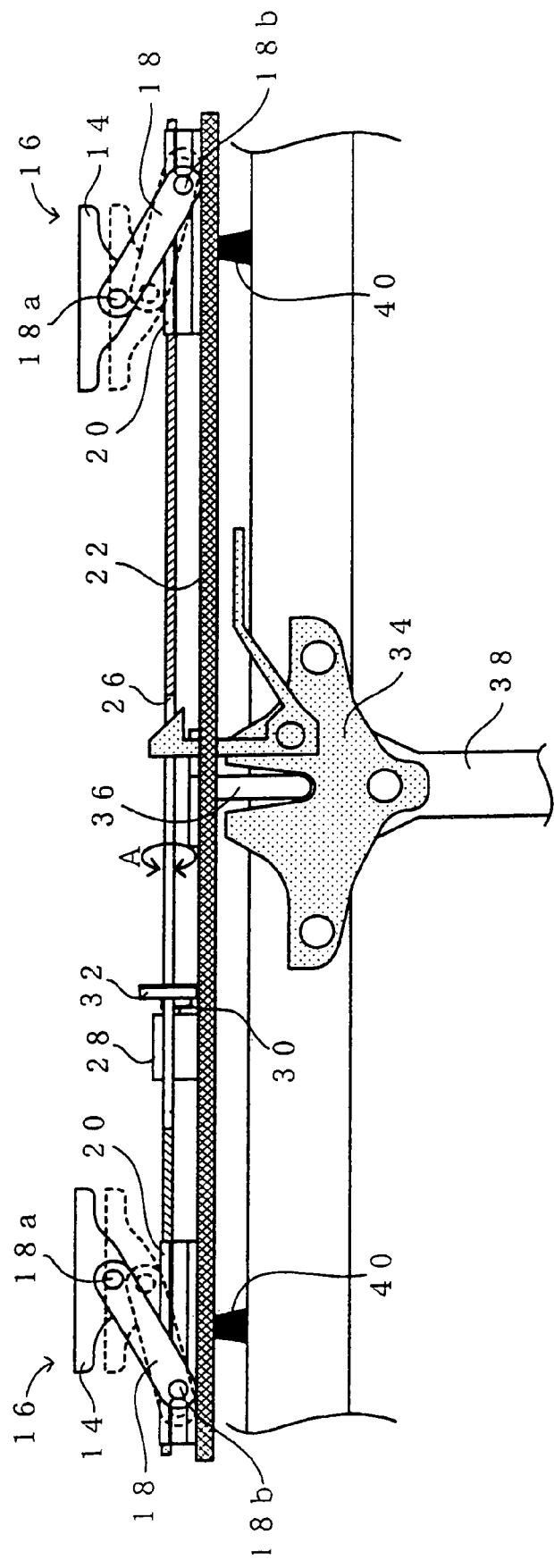
FIG. 3 is a front view of the front portion lift-up mechanism in FIG. 1.

As shown in FIG. 3, the geared cable 26 is rotated in a direction of arrow A in FIG. 3 by an actuator 28 serving as a first driving apparatus that is disposed at the lock striker reinforce 22. In other words, a pinion gear 30 is provided at a rotational axis of the actuator 28, and a rotational gear 32 is provided at the geared cable 26. Therefore, due to a rotation of the actuator 28, the pinion gear 30 is rotated, and the geared cable 26 is rotated in a direction of arrow A in FIG. 3, via the rotational gear 32. Accordingly, the gear 24, which is pivotally supported to the other end portion 18b of the link member 18, is rotated along the geared cable 26, and the other end portion 18b of the link member 18 is moved along the slide groove 20a of the slide rail 20. Consequently, the front of the hood 12 is lifted up. Note that, the hood 12 is not illustrated in FIGS. 2 and 3.

Here, a lift-up speed of the hood 12 is defined by a gear ratio of the pinion gear 30 to the rotational gear 32, and this gear ratio is appropriately determined. Further, in the present embodiment, the geared cable 26 is rotated by using the pinion gear 30 and the rotational gear 32. However, in accordance with a gear ratio, a gear/gears can further be added.

On the other hand, the lock striker reinforce 22 on which the slide rail 20 is provided is provided with a striker 36 which can engage with or disengage from a locking mechanism 34 which is provided at a vehicle body. Due to an engagement/disengagement of the striker 36 with respect to the lock mechanism 34 and the striker 36, opening/closing of the hood 12 is carried out. Further, the lock mechanism 34 can be provided at the lock striker reinforce 22, and the striker 36 can be provided at a vehicle body. Moreover, since a lock mechanism in general use can be applied to the lock mechanism 34 of the present invention, a detailed description of the lock mechanism 34 will be omitted.

A pair of bump rubbers 40, which are formed by elastic members such as rubber, is provided at a radiator core support panel 38 which is provided at a vehicle, and the lock striker reinforce 22 is supported by the pair of the bump rubbers 40 in a state in which the striker 36 is engaged with the lock mechanism 34 provided at the vehicle. In other words, in a state in which the hood 12 is closed (i.e., a state in which the striker 36 and the lock mechanism 34 are engaged with each other), the lock striker reinforce 22 is supported at at least three points including a support in which the striker 36 and the lock mechanism 34 are engaged with each other, and two supports in which the lock striker reinforce 22 is supported by the pair of the bump rubbers 40. Note that, the bump rubber 40 can be provided in a pair or more.

Figure 4:
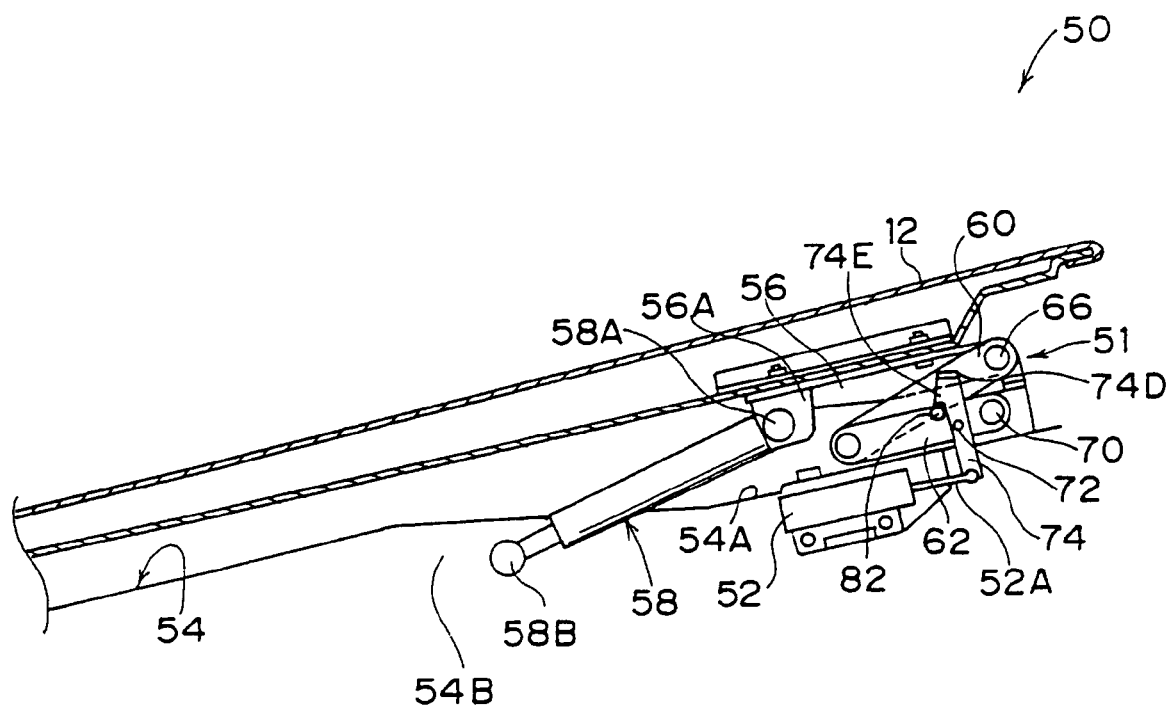
FIG. 4 is a schematic structural view of an example of a rear portion lift-up mechanism.
Figure 5:
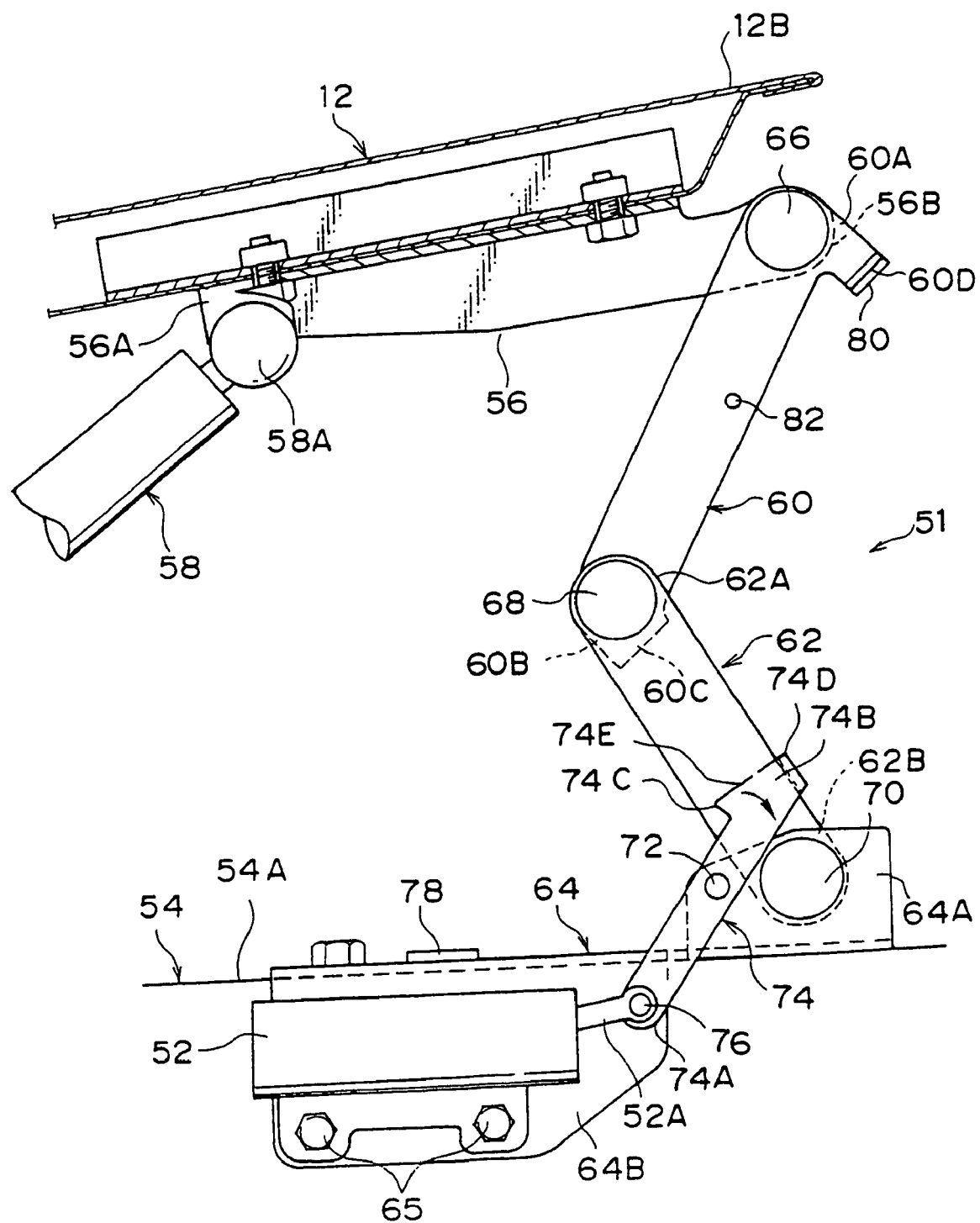
FIG. 5 is an enlarged structural view of an example of the rear portion lift-up mechanism in FIG. 4.
Figure 6:
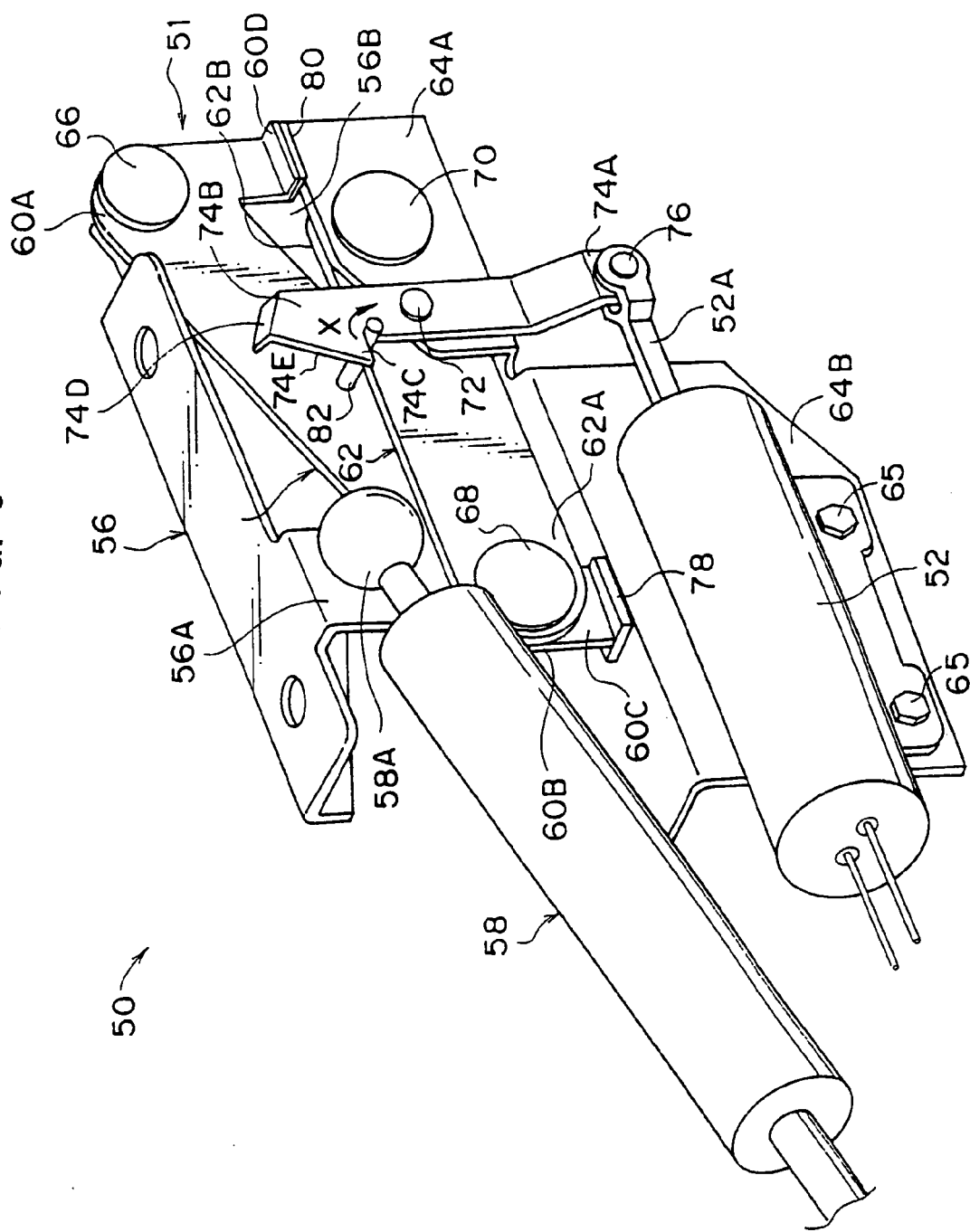
FIG. 6 is an enlarged perspective structural view of an example of the rear portion lift-up mechanism in FIG. 4.

With reference to FIGS. 4 to 6, a detailed description of a rear portion lift-up mechanism will be made next.

As shown in FIG. 4, a rear portion lift-up mechanism 50 mainly includes a hood holding unit 51, a lock plate 74, a hood damper stay 58, and a solenoid 52 which serves as a second driving apparatus.

The solenoid 52 for holding the hood holding unit 51 in a normal state is disposed at a region 54A of an apron upper member 54 facing the rear of the hood 12.

A hood damper stay 58, which includes a piston containing therein gas or the like and a piston rod, is disposed between a front portion 56A of a hood hinge 56 in the hood holding unit 51, and a mounting portion 54B of the apron upper member 54 which is disposed closer to a vehicle front side than the hood hinge 56. End portions 58A and 58B of the hood damper stay 58 are connected to the front portion 56A of the hood hinge 56 and the mounting portion 54B of the apron upper member 54, respectively, so as to be able to rotate. Further, the end portion 58A of the hood damper stay 58 at the hood 12 side is positioned closer to a vehicle rear side than the mounting portion 58 at the apron upper member 54 side. In other words, the hood damper stay 58 is inclined such that the mounting portion 58A at the hood 12 side is positioned closer to the vehicle rear side. Moreover, the mounting portion 58A at the hood 12 side of the hood damper stay 58 is positioned further closer to the vehicle rear side than a lengthwise intermediate point of the hood 12.

As shown in FIG. 5, other than the hood hinge 56, the hood holding unit 51 includes a first intermediate arm 60, a second intermediate arm 62, and a bracket 64 which is fixed to the mounting portion 54A of the apron upper member 54. One end portion 60A of the first intermediate arm 60 is pivotally supported to be able to rotate, by a pin 66, to a rear end portion 56B of the hood hinge 56. Further, one end portion 62A of the second intermediate arm 62 is pivotally supported to be able to rotate to the other end portion 60B of the first intermediate arm 60 by a pin 68. The other end portion 62B of the second intermediate arm 62 is pivotally supported to a rear portion 64A of a bracket 64 by a pin 70. Further, a front portion 64B of the bracket 64 is double-fastened by bolts 65 between the solenoid 52 and the apron upper member 54. Further, a substantially central portion in a lengthwise direction of a lock plate 74 is pivotally supported to a front end portion of the rear potion 64A of the bracket 64 by a pin 72. A lower end portion 74A of the lock plate 74 is rotatably connected to a rod 52A of the solenoid 52 by a pin 76.

On the other hand, a retaining pawl 74C is formed at a front side of an upper end portion 74B of the lock plate 74. The retaining pawl 74C can engage with a pin 82 which is formed at a substantially central portion in a lengthwise direction of the first intermediate arm 60.

As shown in FIG. 6, in a normal state, the retaining pawl 74C of the lock plate 74 engages with the pin 82 of the first intermediate arm 60 and a stopper portion 60C, which is formed at the first intermediate arm 60 beneath the pin 68, abuts the bracket 64 through a cushion 78. Further, a stopper portion 60D, which is formed at the first intermediate arm 60 beneath the pin 66, abuts the bracket 64 through a cushion 80. Accordingly, the hood holding unit 51 is fixed at these three fixture points i.e., the retaining pawl 74C, the stopper portion 60C, and the stopper portion 60D. Moreover, at this time, a slight pressure is applied to the cushions 78 and 80 thereby rattling is prevented from occurring at the aforementioned three fixture points.

On the other hand, when the solenoid 52 is operated, the rod 52A of the solenoid 52 is moved toward the vehicle front, and the lock plate 74 is rotated about the pin 72 in a clockwise rotational direction in FIG. 6 (direction of arrow X in FIG. 6). For this reason, the engagement between the retaining pawl 74C of the lock plate 74 and the pin 82 of the first intermediate arm 60 is released. When the engagement between the retaining pawl 74C of the lock plate 74 and the pin 82 of the first intermediate arm 60 is released, due to an urging force of the hood damper stay 58, the first intermediate arm 60 and the second intermediate arm 62 rotate about the respective pins 66, 68 and 70, and as shown in FIG. 5, the rear 12B of the hood 12 moves upward.

At this time, a bending portion 74D, which is formed at the upper end portion 74B of the lock plate 74 and which is bent at a vehicle transverse direction inner side, abuts the vicinity of the end portion 62B of the second intermediate arm 62, to stop the hood 12 at a predetermined upper position (position shown in FIG. 5).

Moreover, the retaining pawl 74C of the lock plate 74 at a vehicle front side surface is inclined to form an inclining surface 74E. After an operation of the solenoid 52 has been stopped, in the same manner as in the case in which the hood 12 is closed in a normal state, when the rear 12B of the hood 12 is moved downward, the inclining surface 74E and the pin 82 of the first intermediate arm 60 are slid with each other, and the lock plate 74 is swung. Consequently, the pin 82 of the first intermediate arm 60 is automatically set at the retaining pawl 74C of the lock plate 74, thus allowing the hood holding unit 51 to be restored.

Figure 7:
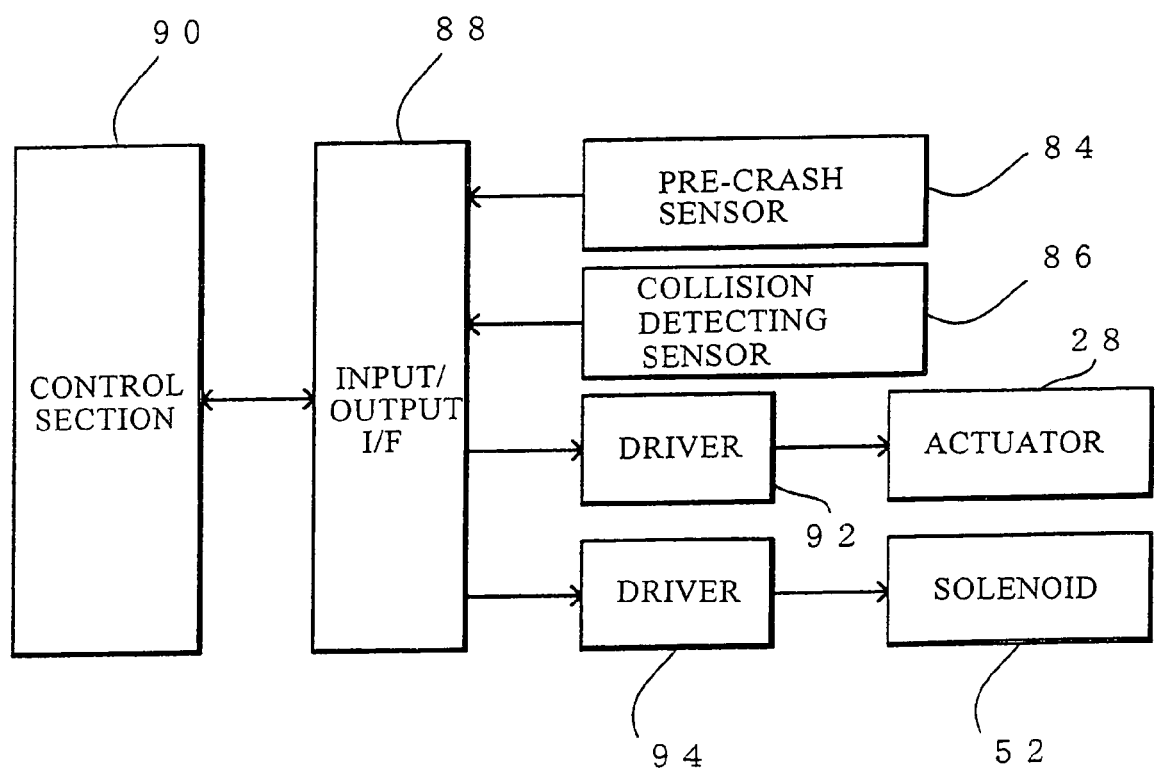
FIG. 7 is a block view of an electrical structure of a collided object-protecting apparatus according to an embodiment of the present invention.

With reference to FIG. 7, a description of an electrical structure of the collided object-protecting apparatus which is structured as described above will be made next.

As shown in FIG. 7, the collided object-protecting apparatus includes a pre-crash sensor 84 and a collision-detecting sensor 86. The pre-crash sensor 84 predicts a vehicle collision by using a millimeter wave radar, a CCD camera or the like, the collision-detecting sensor 86 detects a vehicle collision by using an acceleration sensor, a touch sensor or the like, and both are respectively provided at a bumper 46 (see FIG. 1) or the like of a vehicle.

The pre-crash sensor 84 and the collision-detecting sensor 86 are connected to an input/output interface (I/F) 88, which is connected to a control section 90 for controlling the collided object-protecting apparatus. A collision-predicting signal from the pre-crash sensor 84 and a collision-detecting signal from the collision-detecting sensor 86 are input to the control section 90 via the input/output interface (I/F) 88.

The control section 90 is structured by a microcomputer including a CPU, an ROM, an RAM, a peripheral device, and the like. The control section 90 controls to operate the front portion lift-up mechanism 10 based on a collision-predicting signal from the pre-crash sensor 84, and thereafter, operate the rear portion lift-up mechanism 50 based on a collision-detecting signal from the collision-detecting sensor 86.

Further, a driver 92 for driving the actuator 28, which drives the link mechanism 16 of the aforementioned front portion lift-up mechanism 10, is connected to the input/output I/F 88, and in response to an instruction from the control section 90, the driver 92 drives the actuator 28 to lift up or put down the front of the hood 12.

Moreover, a driver 94 for driving the solenoid 52 of the aforementioned rear portion lift-up mechanism 50 is connected to the input/output I/F 88. In response to an instruction by the control section 90, the driver 94 drives the solenoid 52, the engagement between the retaining pawl 74C of the lock plate 74 and the pin 82 of the first intermediate arm 60 is released, and due to an urging force from the hood damper stay 58, the hood 12 is lifted up.

Figure 8:
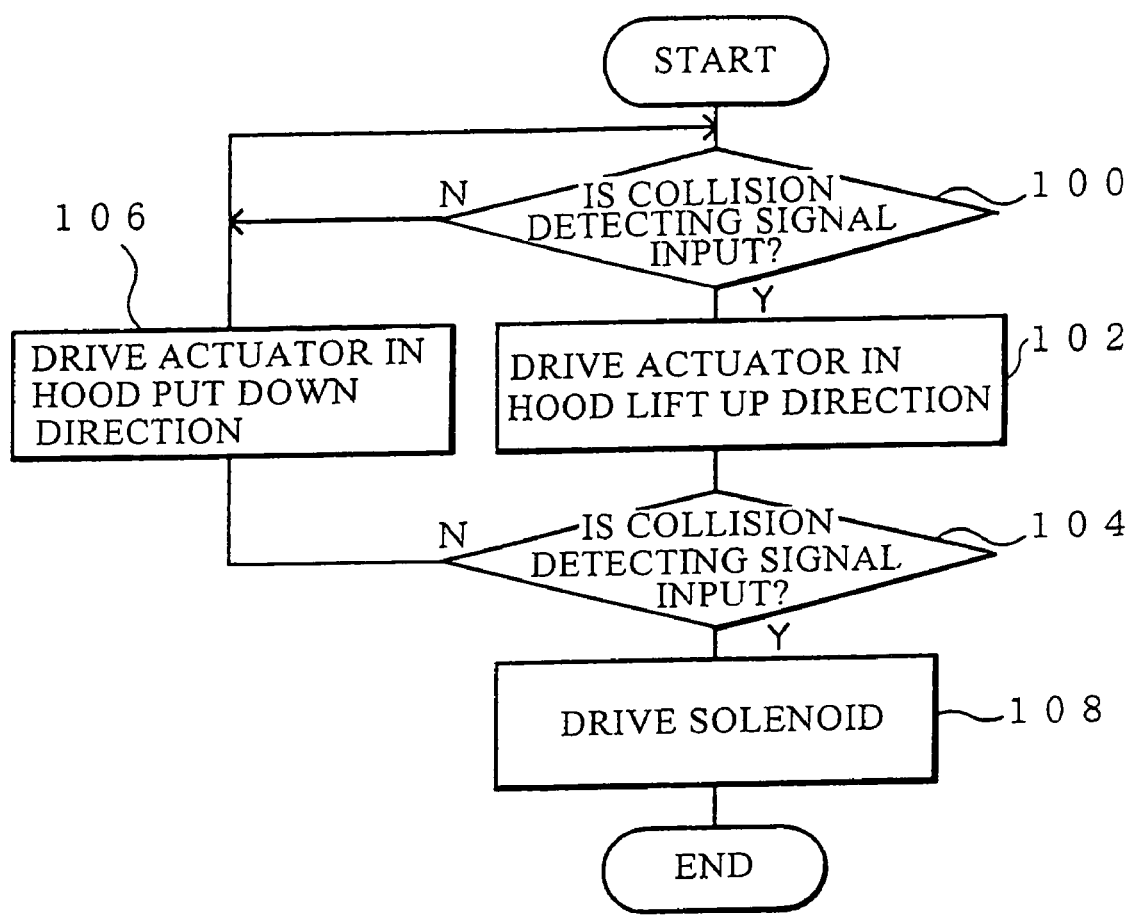
FIG. 8 is a flowchart of an example of a control that is carried out by a control section of the collided object-protecting apparatus according to the embodiment of the present invention.

With reference to a flowchart in FIG. 8, an example of a control carried out at the control section 90 of the collided object-protecting apparatus structured as described above will be explained next. However, the explanation will be given on the assumption that the control by the control section 90 is carried out in a state in which the striker 36 and the lock mechanism 34 are engaged with each other, and the rear of the hood is in a normal state.

First, in step 100, it is judged whether a collision-predicting signal is inputted from the pre-crash sensor 84. If the judgment is negated, the process waits until the judgment is affirmed, and then, goes to step 102.

In step 102, when the control section 90 instructs to drive the actuator 28, the actuator 28 is driven in a direction of lifting up the front of the hood 12.

In other words, due to the rotation of the actuator 28 in a direction of arrow A in FIG. 3, the pinion gear 30 is rotated, and the geared cable 26 is rotated via the rotational gear 32. Accordingly, the gear 24, which is pivotally supported to the end portion 18*a* of the link member 18, is rotated along the geared cable 26, and the end portion 18*b* of the link member 18 is moved in a horizontal direction (direction of arrow B in FIG. 2) along the slide groove 20*a* of the slide rail 20. Note that, at this time, spiral-threaded grooves of the geared cable 26 are set such that the end portion 18*b* of the link member 18 moves in a vehicle central direction.

Figure 9:
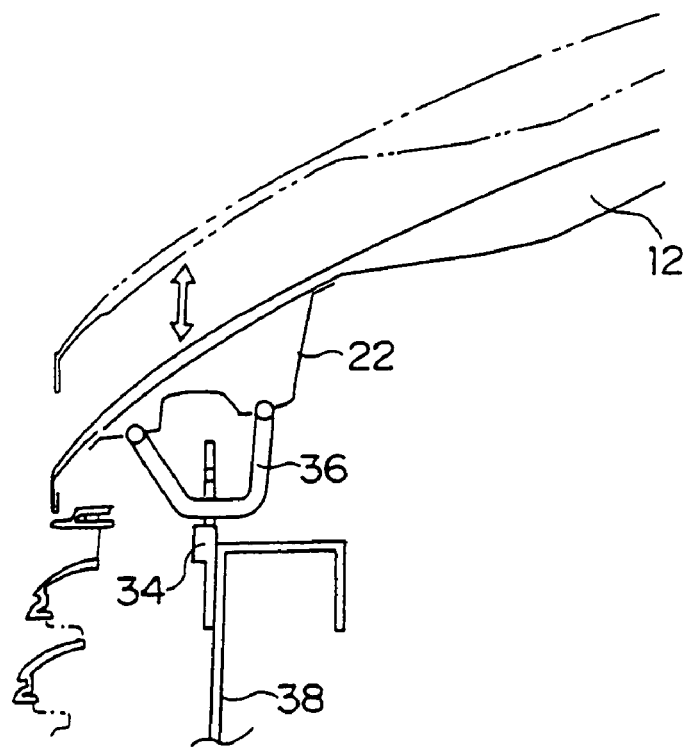
FIG. 9 is a cross-sectional view of a periphery of a locking mechanism before and after lifting up the front of a hood.

In this way, when the actuator 28 is driven, and the end portion 18*b* is moved horizontally in a vehicle central direction, the link member 18 is rotated about the end portion 18*a* which is pivotally supported to the hood inner panel 14 side, and the link mechanism 16 is moved from a state of a dotted line to a state of a solid line in FIG. 3. Accordingly, the link member 18 is raised, the hood 12 is lifted up via the hood inner panel 14, and, as shown in FIG. 9, in a state in which the striker 36 and the lock mechanism 34 are engaged with each other, just the hood 12 can easily be lifted up. Note that, in FIG. 9, the solid line shows a state before lifting up the hood 12, while the dotted line shows a state after lifting up the hood 12.

Next, after the hood 12 has been lifted up in step 102, the process goes to step 104 where it is judged whether a collision-detecting signal is input from the collision-detecting sensor 86. If the judgment is negated, for example, if a collision-detecting signal is not input from the collision-detecting sensor 86 within a predetermined time, the process goes to step 106. Accordingly, the control section 90 instructs to drive the actuator 28, the actuator 28 is driven in a direction of putting down the hood 12, and the process returns to the aforementioned step 100.

In other words, due to a rotation of the actuator 28 in a direction opposite to the rotational direction of the actuator 28 in step 102, the pinion gear 30 is rotated, and due to a rotation of the pinion gear 30, the rotational gear 32 is rotated, and the geared cable 26 is rotated. Therefore, the gear 24, which is pivotally supported to the end portion 18*b* of the link member 18, is rotated along the geared cable 26, and the end portion 18*b* of the link member 18 is moved in a vehicle horizontal direction (vehicle external direction, i.e., a direction of arrow B in FIG. 2) along the slide groove 20*a* of the slide rail 20. Then, when the end portion 18*b*, which is supported at the slide rail 20 side of the link member 18, is moved horizontally in a vehicle external direction, the link member 18 is rotated about the end portion 18*a* which is pivotally supported to the hood inner panel 14 side. The link member 18 is moved from a state of a solid line to a state of a dotted line in FIG. 3, and becomes substantially horizontal. The hood 12 is put down via the hood inner panel 14. Accordingly, if an object does not collide with the vehicle, the hood 12 is restored to its original state, thereby a driver can continue driving.

On the other hand, if the judgment in step 104 is affirmed, the process goes to step 108 where the solenoid 52 is driven, and a sequence of the processes is completed.

Figure 10:
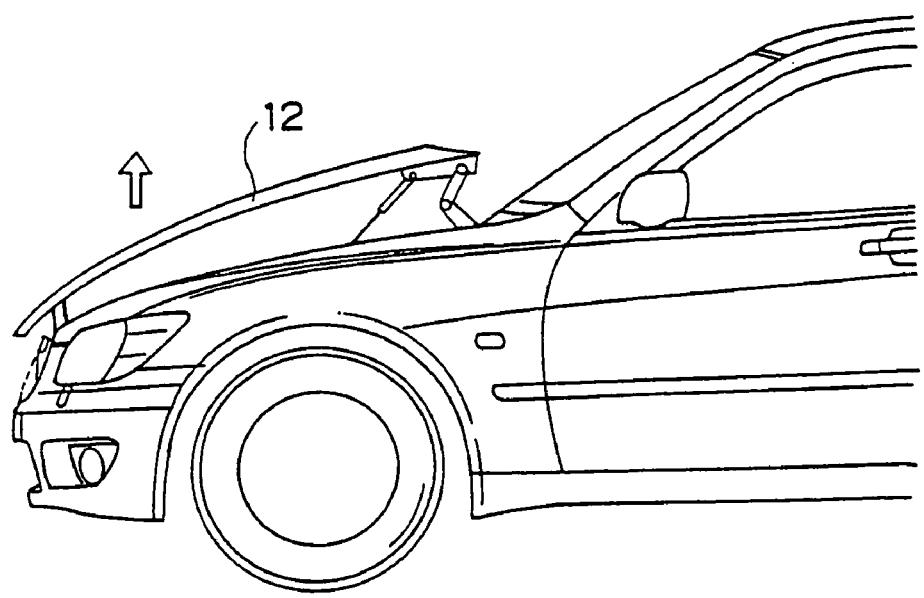
FIG. 10 is a view of a state in which the front and the rear of the hood are lifted up.

In other words, in step 108, the rod 52A of the solenoid 52 is moved forward, and the lock plate 74 is rotated about the pin 72 in a direction of arrow X in FIG. 6. Therefore, the engagement between the retaining pawl 74C of the lock plate 74 and the pin 82 of the first intermediate arm 60 is released. Thus, as shown in FIG. 5, due to an urging force of the hood damper stay 58, the rear 12B of the hood 12 is pushed upward, and lifted up. Accordingly, as shown in FIG. 10, when the rear portion lift-up mechanism 50 is lifted up, the front portion lift-up mechanism 10 is also lifted up thus making it possible to effectively absorb the impact applied to a collided object. Further, when a collided object impacts against the rear 12B of the hood 12, this impact occurs a short time after impacting with the collided object such as a pedestrian. Accordingly, even though the hood 12 is lifted up by the rear portion lift-up mechanism 50 after the collision has been detected, a reduction in the impact applied to a collided object can be effectively made.

In this way, in the collided object-protecting apparatus according to the present embodiment, if a collision is predicted by the pre-crash sensor 84, the front portion lift-up mechanism 10 is lifted up to lift up the front of the hood, and if a collision is avoided, the hood 12 can be automatically restored to the original state, and time and labor taken for restoring the hood 12 to the original state can be saved.

Further, the rear portion lift-up mechanism is driven, i.e., the rear 12B of the hood 12 is lifted up only when a collision is detected by using the collision-detecting sensor 86. For this reason, frequencies at which the rear portion is lifted up can be minimized as compared to a case of the front portion lift-up mechanism 10. In other words, when the rear 12B of the hood 12 is lifted up, hindrance of the driver's visibility due to the rear 12B of the hood 12 being lifted up can be minimized.

Accordingly, due to a control of operations of the front portion lift-up mechanism 10 and the rear portion lift-up mechanism 50 at different timings, it is possible to prevent negative effects in which unnecessary hindering of a driver's visibility due to an operation of the rear portion lift-up mechanism 50. Consequently, each mechanism for absorbing impact applied to a collided object can be operated at an optimal timing.

Note that, a mechanical structure of each of the front portion lift-up mechanism 10 and the rear portion lift-up mechanism 50 in the above embodiment is not limited to this, and the present invention can be applied to a front portion lift-up mechanism or a rear portion lift-up mechanism having another mechanical structure.

SECOND EMBODIMENT

A description of a collided object-protecting apparatus according to a second embodiment of the present invention will be made next. The collided object-protecting apparatus according to the first embodiment of the present invention is structured to include the front portion lift-up mechanism 10 for lifting up the front of the hood 12, and the rear portion lift-up mechanism 50 for lifting up the rear of the hood 12. In the collided object-protecting apparatus according to the second embodiment of the present invention, a hood airbag apparatus (a second shock-absorbing mechanism or a third shock-absorbing mechanism) is provided in place of the rear portion lift-up mechanism 50. Note that, since the front portion mechanism in the second embodiment is structured in the same manner as that in the first embodiment of the present invention, a detailed description thereof will be omitted.

Figure 11:
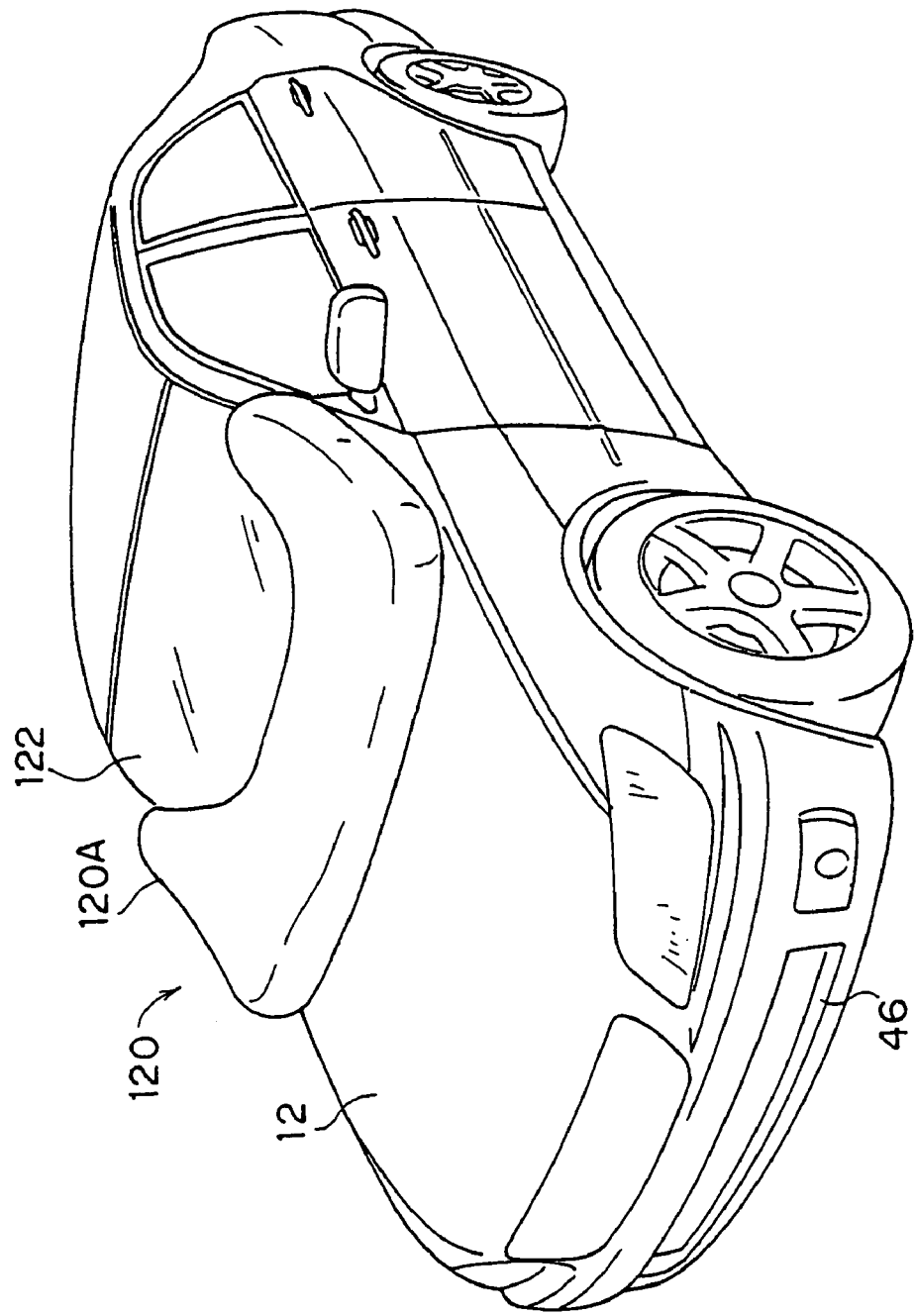
FIG. 11 is a perspective view of an example of a state in which a hood airbag apparatus is mounted on a vehicle.

FIG. 11 shows an arrangement of a hood airbag apparatus. Note that the arrangement of the hood airbag apparatus will be explained such that portions identical to those in the first embodiment are denoted by the same reference numerals. Further, FIG. 11 is a view illustrating a state in which an airbag bag body 120A of a hood airbag apparatus 120 is inflated.

The hood airbag apparatus 120 is provided in a cowl portion of a vehicle. In the hood airbag apparatus 120, when a current is applied to an inflator 98 (see FIG. 12) serving as a second driving apparatus or a third driving apparatus, due to gas provided from the inflator 98, the airbag bag body 120A, which is folded and accommodated in a case, breaks with an upper portion of the case, and is inflated at the rear of the hood 12 and at the front of a front shield glass 122. That is, the airbag bag body 120A can absorb impact applied to a collided object.

Next, with reference to FIG. 12, a description of an electric structure of the collided object-protecting apparatus according to the present embodiment will be made.

Figure 12:
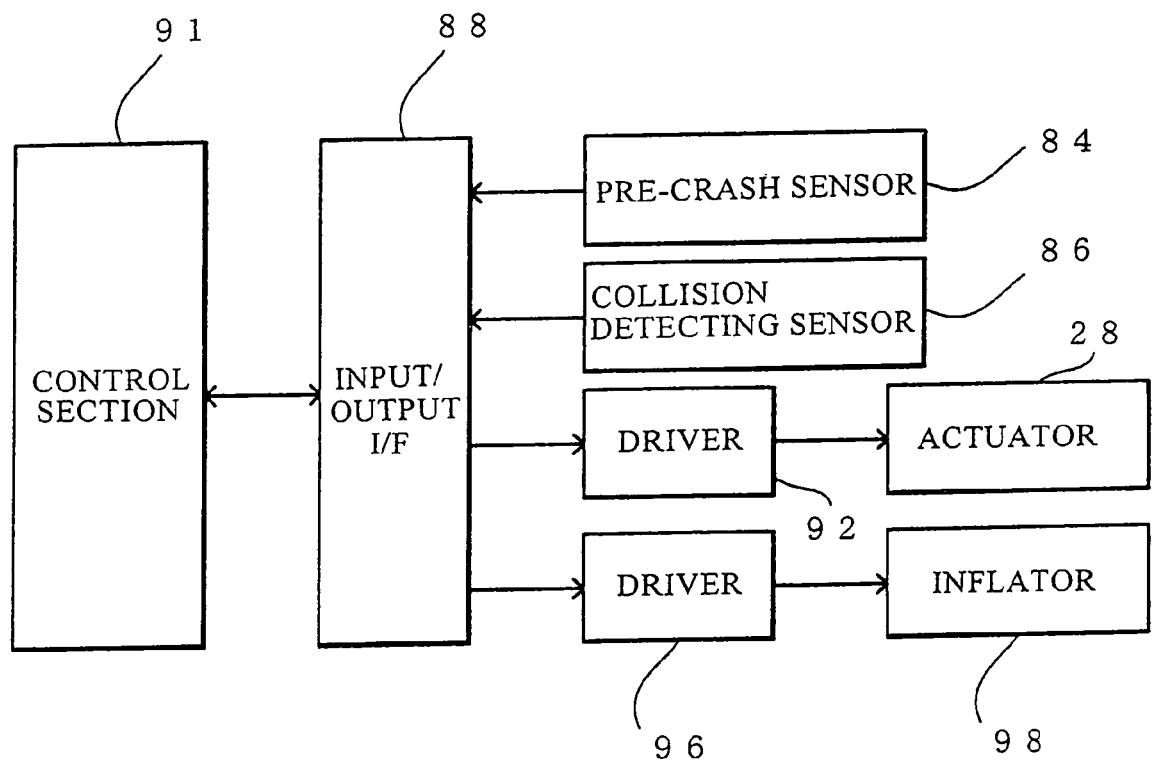
FIG. 12 is a block view of an electrical structure of a collided objection-protecting apparatus according to another embodiment of the present invention.

As shown in FIG. 12, the collided object-protecting apparatus according to the present embodiment includes the pre-crash sensor 84 and the collision-detecting sensor 86. The pre-crash sensor 84 predicts a vehicle collision by using a millimeter wave radar, a CCD camera or the like, the collision-detecting sensor 86 detects a vehicle collision by using an acceleration sensor, a touch sensor or the like, which are provided at the bumper 46 (see FIG. 11) or the like of a vehicle.

The pre-crash sensor 84 and the collision-detecting sensor 86 are connected to the input/output interface (I/F) 88, which is connected to a control section 91 for controlling the collided object-protecting apparatus. A collision-predicting signal from the pre-crash sensor 84 and a collision-detecting signal from the collision-detecting sensor 86 are input to the control section 91 via the input/output interface (I/F) 88.

The control section 91 is structured by a microcomputer including a CPU, an ROM, an RAM, a peripheral device, and the like. The control section 91 controls to operate the front portion lift-up mechanism 10 based on a collision-predicting signal from the pre-crash sensor 84, and thereafter, operate the airbag apparatus 120 based on a collision-detecting signal from the collision-detecting sensor 86.

Further, the driver 92 for driving the actuator 28, which drives the link mechanism 16 of the aforementioned front portion lift-up mechanism 10, is connected to the input/output I/F 88, and the driver 92 is instructed by the control section 91 to drive the actuator 28, and the front of the hood 12 is lifted up or put down.

Moreover, a driver 96 for applying a predetermined amount of current to the inflator 98 of the aforementioned airbag apparatus 120 is connected to the input/output I/F 88. The driver 96 is instructed by the control section 91 to apply a current to the inflator 98, and gas is discharged from the inflator 98 to inflate the airbag bag body 120A.

Figure 13:
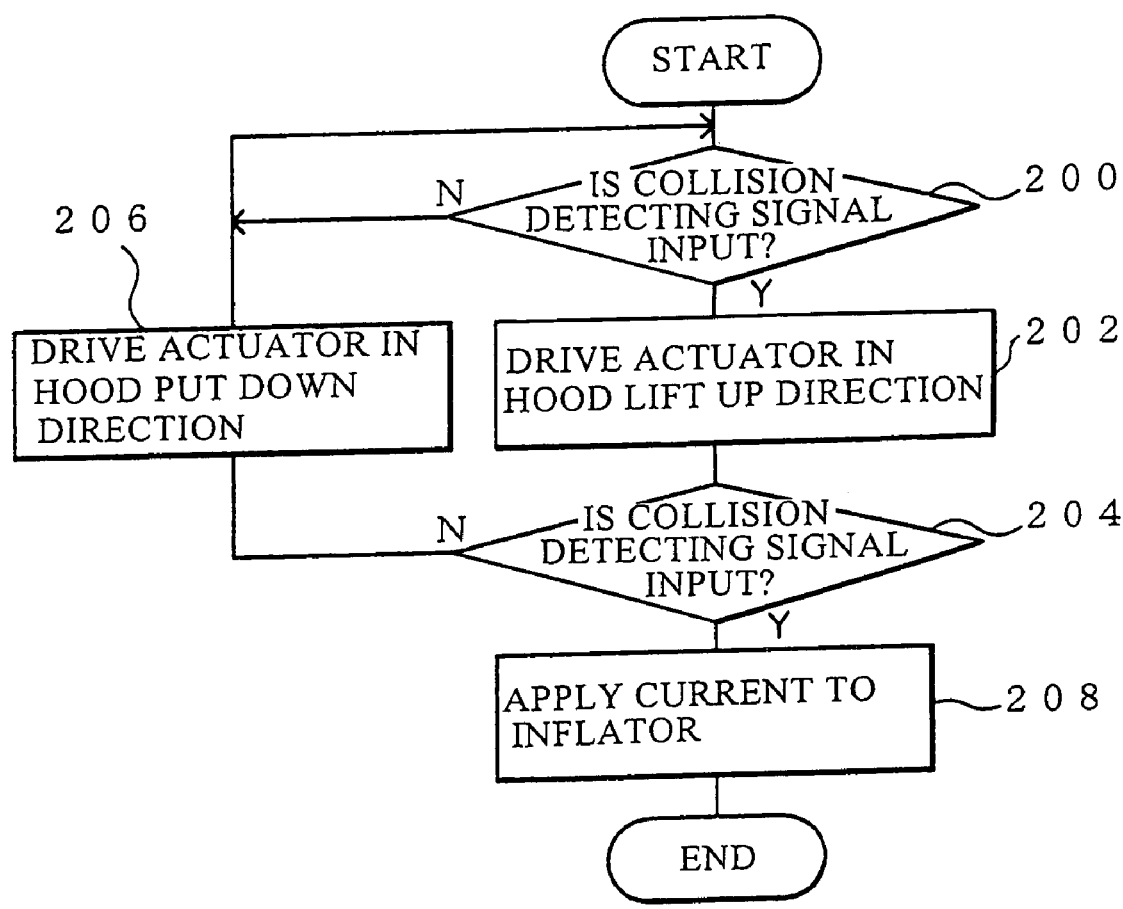
FIG. 13 is a flowchart of an example of a control that is carried out by a control section of the collided object-protecting apparatus according to another embodiment of the present invention.

Next, with reference to a flowchart in FIG. 13, a description of an example of a control carried out by the control section 91 of the collided object-protecting apparatus structured as described above will be made. Note that, the description will be given on the assumption that the control by the control section 91 is carried out in a state in which the striker 36 and the lock mechanism 34 are engaged with each other.

First, in step 200, it is judged whether a collision-predicting signal is inputted from the pre-crash sensor 84. If the judgment is negated, the process waits until the judgment is affirmed, and then, goes to step 202.

In step 202, the actuator 28 is instructed by the control section 91 to be driven in a direction in which the front of the hood 12 is lifted up.

In other words, due to a rotation of the actuator 28 in a direction of arrow A in FIG. 3 as described in the first embodiment of the present invention, the pinion gear 30 is rotated, and the geared cable 26 is rotated through the rotational gear 32. Accordingly, the gear 24, which is pivotally supported by the end portion 18a of the link member 18, is rotated along the geared cable 26, and the end portion 18b of the link member 18 is moved in a horizontal direction (direction of arrow B in FIG. 2), along the slide groove 20a of the slide rail 20. Note that, at this time, spiral grooves of the geared cable 26 are set such that the end portion 18b of the link member 18 is moved in a vehicle central direction.

In this way, by the actuator 28 being driven, when the end portion 18b is horizontally moved in a vehicle central direction, the link member 18 is rotated about the end portion 18a which is pivotally supported at the hood inner panel 14 side, and the link mechanism 16 is moved from a state of a dotted line to a state of a solid line, as shown in FIG. 3. Accordingly, the link member 18 is risen, and the hood 12 is lifted up via the hood inner panel 14, and as shown in FIG. 9, only the hood 12 can be easily lifted up in a state in which the striker 36 and the lock mechanism 34 are engaged with each other. Here, in FIG. 9, the solid line shows a state before lifting up the hood 12, while the dotted line shows a state after lifting up the hood 12.

Next, after the hood 12 has been lifted up in step 202, the process goes to step 204 where it is judged whether a collision-detecting signal is inputted from the collision-detecting sensor 86. If the judgment is negated, for example, if the collision-detecting signal is not inputted from the collision-detecting sensor 86 within a predetermined time, the process goes to step 206. Accordingly, the actuator 28 is instructed by the control section 91 to be driven in a direction in which the hood 12 is put down, and the process returns to the aforementioned step 200.

In other words, due to a rotation of the actuator 28 in a direction opposite to the rotational direction of the actuator 28 in step 202, the pinion gear 30 is rotated, and due to a rotation of the pinion gear 30, the rotational gear 32 is rotated, and the geared cable 26 is rotated. Therefore, the gear 24, which is supported by the end portion 18b of the link member 18 is pivotally supported, is rotated along the geared cable 26 along the geared cable 26, and the end portion 18b of the link member 18 is moved in a vehicle horizontal direction (vehicle external direction, i.e., a direction of arrow B in FIG. 2) along the slide groove 20a of the slide rail 20. Thereafter, when the end portion 18b, which is supported at the slide rail 20 side, of the link member 18 is moved horizontally in a vehicle external direction, the link member 18 is rotated around the end portion 18a which is pivotally supported at the hood inner panel 14 side, the link member 18 is moved from a state of a solid line to a state of a dotted line in FIG. 3, the link member 18 becomes substantially horizontal, and the hood 12 is put down via the hood inner panel 14. Accordingly, if an object does not collide the vehicle, the hood 12 is restored to its original state, thereby a driver can continue driving.

On the other hand, if the judgment in step 204 is affirmed, the process goes to step 208 where a current is applied to the inflator 98, a sequence of processes is completed.

In other words, in step 208, due to a current applied to the inflator 98, due to gas within the inflator 98, the airbag bag body 120A is inflated at the rear of the hood 12 and at the front portion of the front shield glass 122, as shown in FIG. 11. Accordingly, impact applied to a collided object can be effectively absorbed. Further, when a collided object impacts against the vicinity of the rear of the hood 12, this impact occurs a short time after impacting with the collided object such as a pedestrian. Accordingly, the hood airbag apparatus 120 can be inflated after detection of collision, a reduction in the impact applied to a collided object can also be effectively made.

In this way, the collided object-protecting apparatus according to the present embodiment, in the same manner as in the first embodiment of the present invention, if collision is predicted by the pre-crash sensor 84, the front portion lift-up mechanism 10 is driven to lift up the front of the hood, and if collision is avoided, the hood 12 is automatically restored to the original state. Accordingly, time and labors taken for restoring the hood to the original state can be saved.

Since the hood airbag apparatus 120 is inflated only when collision was detected by the collision-detecting sensor 86, unnecessary inflation of the hood airbag apparatus 120 can be prevented, and hindrance of a driver's visibility due to unnecessary inflation of the hood airbag apparatus 120 can be minimized.

Thus, by controlling operations of the front portion lift-up mechanism 10 and the hood airbag apparatus 120 at different timings, a drawback such as unnecessary inflation 120 can be prevented thus making it possible to operate each of the mechanisms for absorbing impact applied to a collided object at an optimal timing.

A mechanical structure of each of the front portion lift-up mechanism 10 and the hood airbag apparatus 120 in the above-described embodiments are not limited to this, and the present invention can be applied to a front portion lift-up mechanism or a hood airbag apparatus having another mechanical structure.

Further, in the first and second embodiments of the present invention, the front portion lift-up mechanism 10 is operated based on a collision-predicting signal from the pre-crash sensor 84. However, instead of using the pre-crash sensor, the front of the hood 12 can be adapted to be lifted up when a value from a vehicle speed sensor reaches a predetermined value (for example, 30 to 80 km/h or the like). In this case, the front of the hood 12 continues to be lifted up as long as the vehicle speed sensor indicates the predetermined value. However, the pre-crash sensor 84 becomes unnecessary thus making it possible to structure a system inexpensively.

Moreover, the collided object-protecting apparatus according to the first embodiment includes the front portion lift-up mechanism 10 and the rear portion lift-up mechanism 50, and the collided object-protecting apparatus according to the second embodiment includes the front portion lift-up mechanism 10 and the hood airbag apparatus 120. However, the collided object-protecting apparatus can be formed by the front portion lift-up mechanism 10, the rear portion lift-up mechanism 50, and the hood airbag apparatus 120 by using the first embodiment and the second embodiment in combination. In this case, when a collision-predicting signal is output from the pre-crash sensor 84, the front portion lift-up mechanism 10 is operated, and when a collision-detecting signal is output from the collision-detecting sensor 86, the rear portion lift-up mechanism 50 and the hood airbag apparatus 120 are operated thus making it possible to exhibit the same effects as those in the first and second embodiments of the present invention. Further, at this time, the rear portion lift-up mechanism 50 may be operated first, and next the operation of the hood airbag apparatus 120 thus facilitating the inflation of the hood airbag.

INDUSTRIAL APPLICABILITY

As described above, in accordance with the present invention, by controlling operations of a plurality of collided object-protecting apparatuses, having a front portion lift-up mechanism for lifting up the front of a hood, respectively, at different timings, each of the collided object-protecting apparatuses can be operated at a timing at which the apparatus can operate effectively without being adversely affected. Accordingly, a plurality of the collided object-protecting apparatuses can be operated at an optimal timing.

What is claimed is:

1. A controller for a plurality of object-protecting apparatuses for absorbing impact at a time when an object collides with a hood, the controller comprising:

a control mechanism for controlling operations of the plurality of the object-protecting apparatuses, respectively, at different timings;

the plurality of object-protecting apparatuses comprising:

a first shock-absorbing mechanism and a second shock-absorbing mechanism, wherein the control mechanism further comprises a prediction mechanism for predicting a vehicle collision and a detection mechanism for detecting a vehicle collision;

wherein the control mechanism controls an operation of the first shock-absorbing mechanism based on prediction results of the prediction mechanism, and controls an operation of the second shock-absorbing mechanism based on detection results of the detection mechanism; and wherein the second shock-absorbing mechanism comprises a rear portion lift-up mechanism for lifting up the rear of a hood, and the control mechanism controls an operation of a driving apparatus of the rear portion lift-up mechanism based on detection results of the detection mechanism.

2. The controller for a plurality of object-protecting apparatuses according to claim 1, wherein the plurality of the object-protecting apparatuses further comprises a third shock-absorbing mechanism, and the control mechanism controls operations of the second shock-absorbing mechanism and the third shock-absorbing mechanism based on detection results of the detection mechanism.

3. The controller for controlling a plurality of object-protecting apparatuses according to claim 2, wherein the control mechanism controls the second shock-absorbing mechanism and the third shock-absorbing mechanism to operate substantially at the same time, based on detection results of the detection mechanism.

4. The controller for controlling a plurality of object-protecting apparatuses according to claim 2, wherein the control mechanism controls operation of the second shock-absorbing mechanism based on detection results of the detection mechanism, and thereafter, controls operation of the third shock-absorbing mechanism.

5. The controller for controlling a plurality of object-protecting apparatuses according to claim 2, wherein the third shock-absorbing mechanism comprises a hood airbag apparatus disposed at the rear of the hood, and the control mechanism controls an operation of a driving apparatus of the hood airbag apparatus based on detection results of the detection mechanism.

6. The controller for controlling a plurality of object-protecting apparatuses according to claim 1, wherein the first shock-absorbing mechanism comprises a front portion lift-up mechanism for lifting up the front of a the hood, and the control mechanism controls an operation of a driving apparatus of the front portion lift-up mechanism based on prediction results of the prediction mechanism.

7. The controller for controlling a plurality of object-protecting apparatuses according to claim 1, wherein the second shock-absorbing mechanism comprises a hood airbag apparatus disposed at the rear of the hood, and the control mechanism controls an operation of a driving apparatus of the hood airbag apparatus based on detection results of the detection mechanism.

* * * * *

UNITED STATES PATENT AND TRADEMARK OFFICE
CERTIFICATE OF CORRECTION

| | | |
|---|---|---|
| PATENT NO. | : 7,483,777 B2 | Page 1 of 1 |
| APPLICATION NO. | : 10/546633 | |
| DATED | : January 27, 2009 | |
| INVENTOR(S) | : Hiroyuki Takahashi et al. | |

It is certified that error appears in the above-identified patent and that said Letters Patent is hereby corrected as shown below:

Claim 6, col. 14, line 25, "of a the" should read --of the--.

Signed and Sealed this

Second Day of June, 2009

JOHN DOLL
*Acting Director of the United States Patent and Trademark Office*